United States Patent
Collins

(10) Patent No.: US 9,508,053 B2
(45) Date of Patent: Nov. 29, 2016

(54) SYSTEM AND METHOD FOR ESTIMATING DELIVERY EVENTS

(71) Applicant: Caterpillar Inc., Peoria, IL (US)

(72) Inventor: Darryl Victor Collins, Jindalee (AU)

(73) Assignee: Caterpillar Inc., Peoria, IL (US)

( * ) Notice: Subject to any disclaimer, the term of this patent is extended or adjusted under 35 U.S.C. 154(b) by 631 days.

(21) Appl. No.: 14/057,462

(22) Filed: Oct. 18, 2013

(65) Prior Publication Data

US 2015/0112954 A1 Apr. 23, 2015

(51) Int. Cl.
*G06F 7/00* (2006.01)
*G06Q 10/08* (2012.01)

(52) U.S. Cl.
CPC .................................. *G06Q 10/083* (2013.01)

(58) Field of Classification Search
USPC ............ 701/50, 124, 472, 53, 54, 84, 87, 90
See application file for complete search history.

(56) References Cited

U.S. PATENT DOCUMENTS

| 4,839,835 A | 6/1989 | Hagenbuch |
| 5,970,435 A | 10/1999 | Ito |
| 7,105,751 B2 | 9/2006 | Terada et al. |
| 7,627,410 B2 | 12/2009 | Berry et al. |
| 8,311,970 B2 | 11/2012 | Mcaree et al. |
| 8,386,134 B2 | 2/2013 | Morey et al. |
| 2005/0234837 A1 | 10/2005 | Ramachandran et al. |
| 2009/0018718 A1* | 1/2009 | Lang ................. G06Q 10/06 701/31.4 |
| 2009/0063222 A1* | 3/2009 | Doan ................. G06Q 10/00 705/7.13 |
| 2011/0066336 A1* | 3/2011 | Adolfson ............ B60K 28/08 701/50 |

FOREIGN PATENT DOCUMENTS

| JP | 2002021122 | 1/2002 |
| JP | 2006312546 | 11/2006 |
| JP | 2008021285 | 1/2008 |

* cited by examiner

*Primary Examiner* — Robert Rennema
*Assistant Examiner* — Md N Mia

(57) ABSTRACT

A computer-implemented method for processing loading operation data to estimate one or more delivery events is described. The loading operation data comprises payload records, each representing a delivery event. The method comprises, for a selected payload record, operating a processing unit to determine whether a delivery weight in respect of the selected payload record is likely to reflect a single delivery event. If the delivery weight is unlikely to reflect a single delivery event the method further comprises generating a synthetic payload record representing an estimated delivery event and comprising synthetic weight and timing values.

17 Claims, 4 Drawing Sheets

SYSTEM AND METHOD FOR ESTIMATING DELIVERY EVENTS

TECHNICAL FIELD

The present invention relates to systems and methods for estimating the delivery of payloads from a loading machine to a haulage machine in a worksite. The invention is particularity suitable for implementation in mining worksites and will be described in relation to that exemplary but non-limiting application.

BACKGROUND

A common operation on many worksites is the excavation and removal of material. For example, in open-cut mines material is excavated from worksite locations (e.g. faces) and loaded into haulage machines for transport to a designated dumping or processing area.

Loading machines such as electric mining shovels are commonly used to load haulage machines with material. The loading machine collects material in a dipper and delivers it to the tray of a haulage machine, which will usually have capacity for multiple dipper-loads of material.

Monitoring and measuring the delivery of material from the loading machine to the haulage machine can be useful, for example in pursuing production objectives of a worksite. To this end haulage machines are often equipped with systems for measuring the payload weight (i.e. the weight of material in the tray) and communicating messages on the payload weight to a central control.

Taking payload weight measurements can, however, be difficult. For example, one way of measuring haulage machine payload weight is by measuring the movement of struts that support the tray. In this case, however, stiction in the struts can lead to initial dipper-loads not registering and measurements not being taken. Further, even where measurements are taken communications across worksites can be poor (particularly if a machine is operating in worksite location with poor coverage) which can lead to messages going missing.

Missing data effects the ability to accurately report loading operations.

SUMMARY

Described herein is a computer-implemented method for processing loading operation data to estimate one or more delivery events, the loading operation data comprising a plurality of payload records, each payload record representing a delivery event, wherein the method comprises, for a selected payload record, operating a processing unit to: determine whether a delivery weight in respect of the selected payload record is likely to reflect a single delivery event, the determination being based at least in part on an estimated loading machine payload weight; if the delivery weight is unlikely to reflect a single delivery event, generate a synthetic payload record representing an estimated delivery event, the synthetic payload record comprising: a weight value representing an estimated haulage machine payload weight at the estimated delivery event, and a timing value representing an estimated time at which the weight value for the synthetic payload record would have occurred, and update the loading operation data by incorporating the synthetic payload record into the loading operation data.

Also described herein is a non-transitory computer-readable medium comprising instructions which, when implemented by a computer processing system, cause the computer processing system to process loading operation data comprising a plurality of payload records, each payload record representing a delivery event, to estimate one or more delivery events by: determining whether a delivery weight in respect of a selected payload record is likely to reflect a single delivery event, the determination being based at least in part on an estimated loading machine payload weight; if the delivery weight is unlikely to reflect a single delivery event, generating a synthetic payload record representing an estimated delivery event, the synthetic payload record comprising: a weight value representing an estimated haulage machine payload weight at the estimated delivery event, and a timing value representing an estimated time at which the weight value for the synthetic payload record would have occurred, and updating the loading operation data by incorporating the synthetic payload record into the loading operation data.

Also described herein is a computer processing system comprising: means for accessing loading operation data comprising a plurality of payload records, each payload record representing a delivery event; means for selecting a payload record from the loading operation data; means for determining whether a delivery weight in respect of the selected payload record is likely to reflect a single delivery event, the determination being based at least in part on an estimated loading machine payload weight; means for, if the delivery weight is unlikely to reflect a single delivery event, generating a synthetic payload record representing an estimated delivery event, the synthetic payload record comprising: a weight value representing an estimated haulage machine payload weight at the estimated delivery event, and a timing value representing an estimated time at which the weight value for the synthetic payload record would have occurred, and means for updating the loading operation data by incorporating the synthetic payload record into the loading operation data.

Also described herein is a computer-implemented method for processing loading operation data to estimate one or more delivery events, the loading operation data comprising a plurality of payload records, each payload record representing a delivery event and comprising: a weight value representing a weight of a haulage machine payload at a particular time; and a timing value representing the particular time, wherein the method comprises operating a computer processing unit to: compare a weight value of a selected payload record to an acceptable value, the acceptable value being based at least in part on an estimated loading machine payload weight; if the weight value of the earliest existing payload record is greater than the acceptable value, generating a synthetic payload record representing an estimated earlier delivery event, the synthetic payload record comprising: a weight value equal to a difference between the weight value of the selected payload record and the estimated loading machine payload weight, and a timing value representing an estimated time at which the weight value for the synthetic payload record would have occurred, the timing value being based on a relationship between the plurality of payload records, and updating the payload delivery data by incorporating the synthetic payload record into the payload data.

As used herein, the term "comprises" (and grammatical variants thereof) is used inclusively and does not exclude the existence of additional features, elements or steps.

BRIEF DESCRIPTION OF THE DRAWINGS

Various aspects and features of an embodiment of the invention will be described with reference to the following figures which are provided for the purposes of illustration and by way of non-limiting example only.

DETAILED DESCRIPTION

Figure 1:
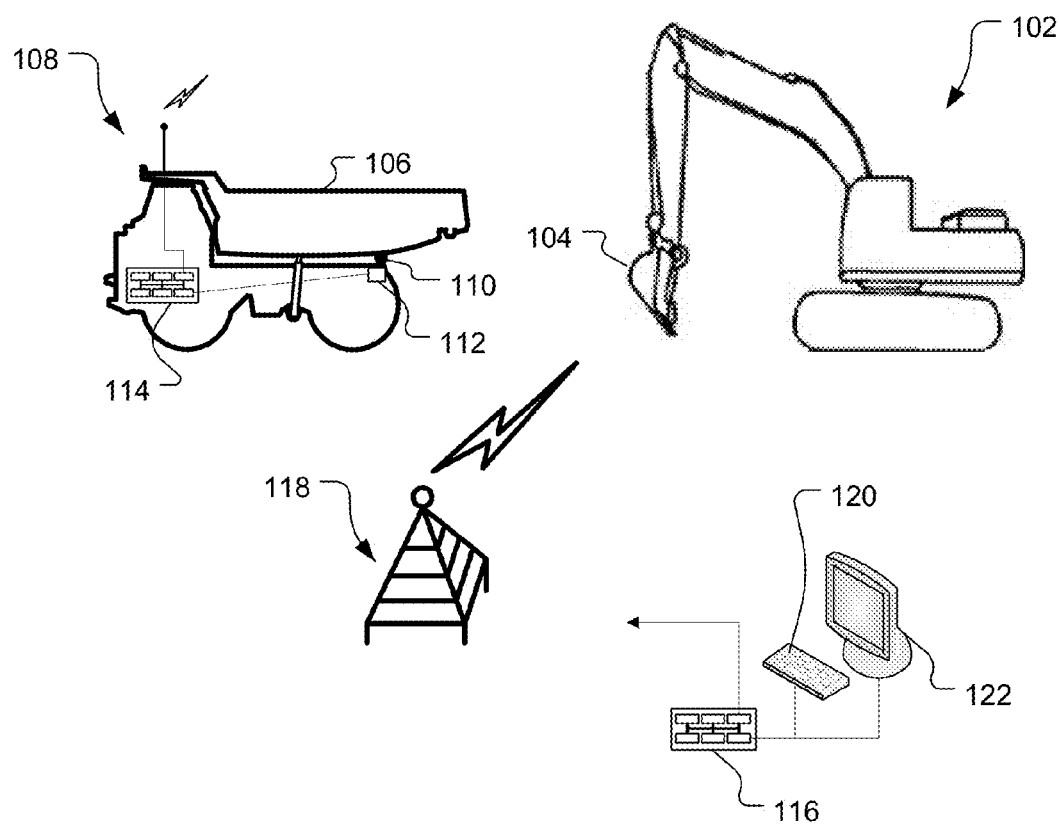
FIG. 1 is a depiction of worksite equipment.

FIG. 1 provides a simple depiction of equipment used in a worksite in which large volumes of material are moved between locations. One such type of worksite is a mine, where a loading machine 102 is operated to collect material (e.g. ore, rocks and the like) in a dipper 104 and dump the material into a tray 106 of a haulage machine 108.

The tray 106 of the haulage machine 108 has a larger capacity than that of the loading machine dipper 104, allowing the haulage machine 108 to receive multiple dipper loads before reaching capacity.

Throughout this specification the material collected in the loading machine dipper 104 will be referred to as the loading machine payload. Similarly the material in the haulage machine tray 106 will be referred to as the haulage machine payload. The delivery/dumping of a load of material from the loading machine dipper 104 into the haulage machine tray 106 will be referred to as a delivery event. The term loading operation will be used to refer to a number of delivery events by which a loading machine 102 loads material into the tray 106 of a particular haulage machine before the haulage machine leaves the loading area. Provided there is sufficient material at the loading location, the loading operation will typically involve sufficient delivery events to load the haulage machine tray 106 to (or near to) capacity.

Once a loading operation has completed, the given haulage machine 108 travels to an alternative worksite location such as a dumping or processing location where it dumps its payload (e.g. by pivoting the tray 106 about pivot pin 110 to a dump position).

Haulage machine 108 is equipped with a sensing assembly 112 configured to measure the weight of the haulage machine payload at any given time. By way of one example, the sensing assembly 112 may comprise one or more strain gauges or load cells positioned to measure the strain/load on the pivot pin 110. Additional and/or alternative sensing assemblies are, of course, possible.

In this particular instance the sensing assembly 112 communicates data with a haulage machine processing system 114 which is configured to process data from the sensing assembly 112 and communicate haulage machine payload messages to a remote processing system 116. Communications between the haulage machine processing system 114 and remote processing system 116 in this example are via a wireless communication link enabled (in part) by a radio communications tower 118. Remote processing system 116 may be on site at the worksite or at a remote location.

Figure 2:
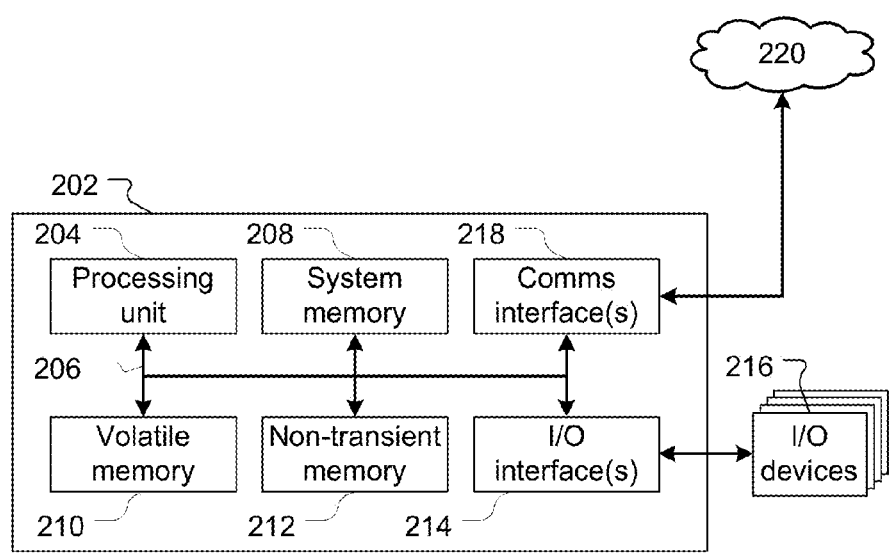
FIG. 2 is a block diagram of a computer processing system suitable for use with embodiments of the invention.

Turning to FIG. 2, a block diagram of a computer processing system 202 is provided. The type of computer processing system 202 depicted in FIG. 2 (and described below) is suitable for use as the remote processing system 116 and/or the haulage machine processing system 114. It will be appreciated, however, that a wide variety of digital processing systems with alternative components and/or architectures could be used for the remote processing system 116 or the haulage machine processing system 114.

Computer processing system 202 (in the present example) comprises at least one processing unit 204 which may comprise a single computational processing device (e.g. a microprocessor or other computational device) or a plurality of computational processing devices. Through a communications bus 206 the processing unit 204 is in data communication with a system memory 208 (e.g. a read only memory storing a BIOS for basic system operations), volatile memory 210 (e.g. random access memory such as one or more DRAM modules), and non-transient memory 212 (e.g. one or more hard disk drives, solid state drives, flash memory devices and suchlike). Instructions and data to control operation of the processing unit 204 are stored on the system, volatile, and/or non-transitory memory 208, 210, and 212, each of which is a computer-readable medium.

The computer processing system 202 also comprises one or more input/output interfaces 214 which allow the system 202 to interface with input/output devices 216. As will be appreciated, a wide variety of input/output devices may be used, for example keyboards, pointing devices, touch-screens, touch-screen displays, displays, microphones, speakers, and other computer-readable media (e.g. hard drives, solid state drives, flash memory devices and the like). By way of example, in FIG. 1 the sensing assembly 112 of the haulage machine 108 may be configured as an input/output device 216 (or devices) and be connected to/communicate with the haulage machine processing system 114 via an input/output interface 214. Similarly, in FIG. 1 remote processing system 116 is illustrated with a keyboard 120 (input device) and monitor 122 (output device), both of which are connected via input/output interfaces 214.

Computer processing system 202 also comprises one or more communications interfaces 218, such as a Network Interface Cards and/or modems, allowing for wired or wireless connection to a communications network 220 such as a local or wide area network or 3G/4G telecommunications network.

Communication with the communications network 220 (and other devices connected thereto) will typically be by the protocols set out in the layers of the OSI model of computer networking. For example, applications/software programs being executed by the computer processing system 202 may communicate using one or more transport protocols, e.g. the Transmission Control Protocol (TCP, defined in RFC 793) or the User Datagram Protocol (UDP, defined in RFC 768). Alternative communications protocols may, of course, be used.

The computer processing system 202 stores in memory and runs one or more applications allowing operators to operate the device system 202. Such applications will typically comprise at least an operating system such as Microsoft Windows®, Apple OSX, Unix, or Linux.

Haulage Machine Payload Information

The haulage machine processing system 114 of the present embodiment is configured to receive data from the sensing assembly 112 and, based on that data, generate and communicate haulage machine payload messages to the remote processing system 116.

The haulage machine processing system 114 and sensing assembly 112 are configured to try and capture delivery events (i.e. the receipt of a load of material from a loading machine dipper 104). This is done, for example, by generating and communicating haulage machine payload messages each time the sensed weight of the haulage machine payload increases or decreases by more than a threshold amount. The threshold amount is set to try and avoid (or at least reduce) the reporting of minor payload weight fluctuations, but to still capture delivery events. This may be achieved by the sensing assembly 112 itself being configured only to report the sensed payload weight when a weight change exceeding the threshold value occurs, or by the sensing assembly 112 continually reporting sensed weight data to the haulage machine processing system 114 and the haulage machine processing system 114 monitoring the weight variation against the threshold.

Haulage machine payload messages may be communicated to the remote processing system 116 in real time, for example over a communications network 220. Alternatively, payload messages may be communicated to the remote processing system 116 in batch mode—either over a communications network such as network 220 or via a physical storage medium (such as a flash memory or hard disk).

With respect to the haulage machine payload messages themselves, a variety of message formats are possible in light of the general aim of communicating the sensed weight of the haulage machine payload. In the present example, each haulage machine payload message comprises: a message type field identifying the type of message (in the present context indicating that the message is a haulage machine payload message); a machine identifier field storing a machine identifier; a current payload field storing the weight of the haulage machine payload as sensed by the sensing assembly 112; and a time field storing the time at which the weight stored in the weight field was sensed/measured.

Table 1 below provides an example message in this format in tabular form:

TABLE 1

| Payload message | | | |
|---|---|---|---|
| Message ID | Machine ID | Payload weight | Time |
| HMPW | HM0001 | 89.1 | 18:04:00 |

The remote processing system 116 receives and processes haulage machine payload messages and stores them as payload records in a memory (such as non transient memory 212 or an external memory device connected by an input/output interface 214). Typically the payload records will be stored in a database of incident messages (and other data) which are received by the system 116 from the worksite. The payload records typically have at least the same or similar data fields to the payload messages: a message type field; a machine identifier field; a payload weight field having a weight value representing the weight of the haulage machine payload at a particular time; and a time field for storing a timing value representing the particular time, and in some instances "processing" the payload messages as they are received may simply involve system 116 storing data from each incoming payload message field into a corresponding payload record data field.

In addition, and as discussed further below, certain embodiments of the invention also make use of uncertainty data with respect to payload weight and time. In order to cater for this information payload records are also provided with payload uncertainty and time uncertainty fields respectively. In some embodiments uncertainties are calculated based on existing data, while in other embodiments nominal uncertainties are used.

In the present context data relating to individual haulage machine loading operations is of interest. System 116 identifies records relating to an individual loading operation by accessing or extracting payload records that relate to haulage machine payload weight messages (i.e. with a type in this instance of HMPW), relate to the same haulage machine (based on machine identifier, e.g. HM001), and that occur within a given time of one another (e.g. have timing values that suggest the same loading operation rather than different loading operations, which would be separated by a relatively large amount of time while the haulage machine travelled to a dumping location, dumped its load, and returned to the loading location). In some cases additional information could be used to identify records relating to the same loading operation—for example information as to the state of the haulage machine/when the state of a haulage machine changes (e.g. loading, travelling, dumping etc), information received from the loading machine or suchlike.

Table 2 below provides an example of payload records that have been accessed/extracted from the larger dataset as payload records relating to a single haulage machine loading operation. A set of payload records identified as relating to a single haulage machine loading operation will be referred to loading operation data.

TABLE 2

| Loading operation data | | | | | |
|---|---|---|---|---|---|
| Message ID | Machine ID | Payload weight | Payload Uncertainty | Time | Time uncertainty |
| HMPW | HM0001 | 89.1 | | 18:04:00 | |
| HMPW | HM0001 | 132.9 | | 18:04:37 | |
| HMPW | HM0001 | 178.6 | | 18:05:10 | |
| HMPW | HM0001 | 212.8 | | 18:05:45 | |
| HMPW | HM0001 | 297.9 | | 18:06:43 | |

The records of the data depicted in Table 2 are in respect of a loading operation of haulage machine 108 with ID HM0001. As can be seen, the first payload record in the loading operation data shown in Table 2 corresponds to the example message provided in Table 1.

INDUSTRIAL APPLICABILITY

As discussed in the background, the haulage machine payload messages received at the remote processing system 116 may not accurately report delivery events. This may be due, for example, to haulage machine payload messages not being received at the remote processing system 116, or relevant payload messages not even being generated by the haulage machine sensing assembly 112/processing system 114 (e.g. due to a delivery event not registering).

To assist in providing a more accurate record of loading operations, the remote processing system 116 is configured to estimate delivery events for which no payload record exists.

In one embodiment the configuration of the remote processing system 116 is achieved by software which comprises instructions which can be executed by a processing unit 204 to implement the relevant features of the method. The software/instructions will typically be stored on a non-transient computer-readable medium, such as a non-transient memory 212 or an external data storage device which can interface with the computer processing system 202 via, for example, an input/output interface 214. The software/instructions may be provided to computer processing system 202 by means of a data signal in a wired or wireless transmission channel over communications interface 218.

In alternative embodiments the system may be implemented as hardware circuitry configured to implement the processes described.

Identifying a Missing Delivery Event

Figure 3:
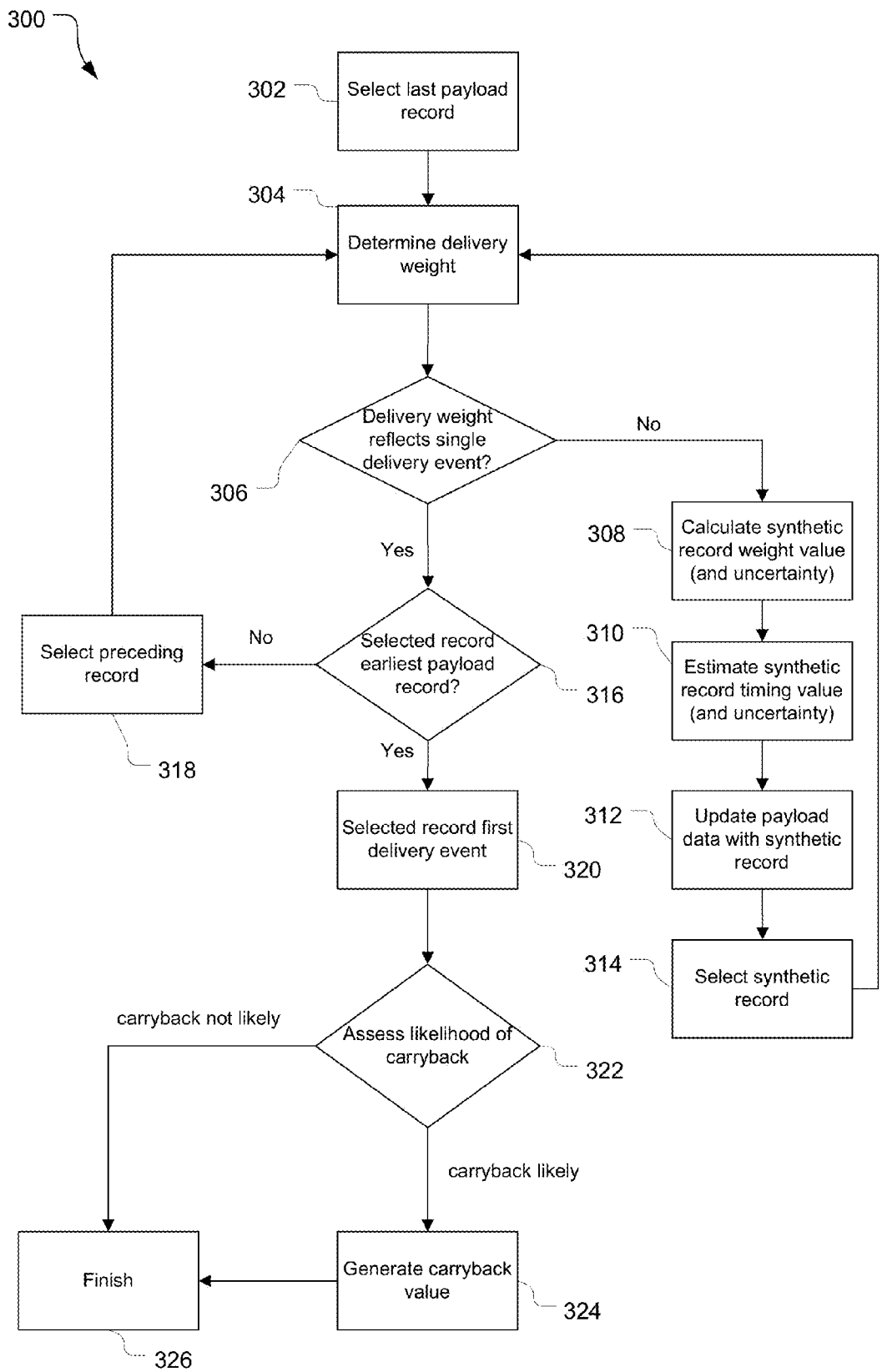
FIG. 3 is a flow diagram illustrating data processing stages in accordance with an embodiment of the invention.

Turning to FIG. 3, a flowchart of a missing delivery event identification process 300 that computer processing system 116 is, in accordance with an embodiment, configured to perform is provided. The various stages of process 300 will be described in general before turning to a specific example.

While the flowchart of FIG. 3 illustrates various processing stages in a specific order, it will be appreciated that not all embodiments of the invention require all processing stages to be performed, and that the order of the stages can in some instances differ from that illustrated.

Process 300 is conducted by system 116 in respect of a given set of loading operation data (which, as discussed above, comprises payload records relating to an individual loading event). At certain stages of the process 300, system 116 identifies payload records in the loading operation data according to their sequence—e.g. a latest record, earliest record, immediately preceding record. This type of identification is made with reference to weight values of the payload records in the loading operation data. For example: the latest payload record is the record with the highest weight value; the earliest payload record is the record with the lowest weight value; an immediately preceding record for any given record is the record with a lower weight value that is closest to the weight value of the given record. In alternative embodiments determining the sequence of records can be achieved with reference to the timing values of the payload records, which in the normal course of operation increase monotonically.

At stage 302, system 116 selects the latest existing payload record in the loading operation data.

At stage 304, system 116 determines a delivery weight in respect of the selected payload record.

The delivery weight for a given record is calculated by subtracting the weight value of the payload record immediately preceding the given payload record from the weight value of the selected payload record. If there is no preceding payload record (i.e. the given payload record is the earliest payload record in the loading operation data), the delivery weight is simply the weight value of the selected payload record.

At stage 306, system 116 determines whether the delivery weight is likely to reflect, or according to known information could reasonably be the result of, a single delivery event (i.e. a single dipper-load of material being received) or is more likely to reflect/be the result of multiple delivery events. In the present embodiment this determination is made by determining whether the delivery weight exceeds an acceptable value which, as described below, is based at least in part on an estimated loading machine payload weight.

If the delivery weight is unlikely to reflect a single delivery event (e.g. the delivery weight is greater than the acceptable value), computer processing system 116 determines that an earlier delivery event that is not represented by the existing payload records is likely to have occurred. In this case system 116 generates a synthetic payload record reflecting the estimated earlier delivery event (stages 308, 310, and 312).

At stage 308, system 116 calculates a weight value for the synthetic payload record by subtracting the estimated loading machine payload weight from the weight value of the selected payload record.

In the present embodiment system 116 also calculates a weight uncertainty value for the synthetic payload record, representing an uncertainty with respect to the calculated weight value. The calculation of the weight uncertainty value is described below.

At stage 310, system 116 estimates a timing value for the synthetic payload record. The timing value represents an estimated time at which the weight value of the synthetic payload record (calculated at stage 308) would have been likely to have occur based on information available from the existing payload records.

System 116 is configured to model the relationship between the weight and timing values of the payload records in the loading operation data by performing a linear regression analysis, though alternative sequential estimation techniques could be used. The relationship between weight and time is then used to estimate a timing value for the weight value calculated at stage 308.

System 116 may be configured to determine the relationship between the existing payload records as part of stage 308 (e.g. modeling the relationship and determining the timing value for the synthetic payload record on the fly). Alternatively, system 116 could model the relationship at an earlier time and store data reflecting the relationship, and then determine the timing value for the synthetic payload record by reference to the stored relationship. In this case system 116 may be configured to re-determine the relationship (and store the relevant relationship data) any time a new payload record is added to the loading operation data.

In the present embodiment system 116 is also configured to determine a timing uncertainty for the synthetic payload record, representing an uncertainty with respect to the estimated timing value. The timing uncertainty value is determined with reference to the weight uncertainty for the synthetic payload record and the relationship between the existing payload records.

For example, where the relationship determined is a linear relationship (as described below), and the weight uncertainty value for the synthetic payload record is x, the timing uncertainty is determined as the time at which a weight of x would have occurred. Where calculated, the timing uncertainty can be calculated using a propagation of uncertainty technique such as that proposed by the National Institute of Standards and Technology (NIST). More specifically, timing uncertainty (sx) is in one embodiment calculated according to the following formula:

$$sx = \mathrm{sqrt}(dx/dy \ast dx/dy \ast sy \ast sy + dx/dc \ast dx/dc \ast sc \ast sc + dx/dm \ast dx/dm \ast sm)$$

where
  sx=timing uncertainty
  sy=payload weight uncertainty (e.g. a nominal value)
  sc=uncertainty in intercept (c)
  sm=uncertainty in slope (m)
  dx/dy=1/m
  dx/dc=−1/m
  dx/dm=−(y−c)/m^2

At stage 312, system 116 updates the loading operation data with a new synthetic payload record having the weight and timing values (and, if used, associated uncertainty values) calculated at stages 308 and 310. The synthetic payload record is also given the appropriate message type and machine identifier (taken from the payload records relating to the loading operation being analyzed).

At stage 314, system 116 selects the newly generated payload record as the "selected" record and repeats process 300 from stage 304 using the newly selected record.

Returning to stage 306, if the delivery weight of the selected payload record is likely to be the result of a single delivery event (e.g. the delivery weight is less than or equal to the acceptable value) this is interpreted by system 116 to indicate that there is no missing delivery event immediately prior to the selected record.

In this case system 116 checks (at stage 316) whether the selected record is the earliest existing payload record in the loading operation data (i.e. whether an earlier payload record to the selected record exists or not). If the selected payload record is not the earliest payload record, system 116 selects (at stage 318) a new record for consideration, being the record immediately preceding the selected record.

Conversely, if at stage 316 the selected payload record is the earliest payload record, system 116 determines (at stage 320) that the selected payload record represents the first delivery event of the loading operation in question.

In this case, and in the present embodiment, system 116 compares (at stage 322) the weight value of the selected payload record (determined at stage 320 to represent the first delivery event) with the estimated loading machine payload weight to determine whether it is likely that the haulage machine 108 in question was carrying material at the commencement of the loading operation. If the weight value of the payload record minus the estimated loading machine payload weight is significantly greater than zero for a given significance level (e.g. 0.25), system 116 determines that there was carryback and (at stage 324) generates a carryback value representing the approximate weight of the material carried back. The carryback value is determined as the difference between the weight value of the selected payload record minus the estimated loading machine payload weight.

The carryback value can be used generally to assist in assessing worksite/haulage machine operations. For example, if the same haulage machine 108 is consistently (i.e. over a number of loading operations) estimated as having a carryback value this may be an indication that the haulage machine 108 has material stuck in the tray 106 that needs to be manually cleaned out.

Following the generation of the carryback value at stage 324 (or a determination at stage 322 that there is no carryback), process 300 finishes at stage 326.

While the missing delivery event identification process 300 has been described and illustrated as a recursive process starting with the latest payload record, it will be appreciated that the principles of the method may be implemented in a variety of different ways. For example, any payload record could be selected (in any particular order) and processed according to stages 304, 306, 308, 310, and 312 (or similar stages) to determine whether a given set of loading operation data is likely to be missing delivery events.

Further, where payload messages are received in real time it may be the case that during (or after the completion of) process 300 system 116 receives additional payload messages which become payload records relevant to the loading operation being analyzed. Such records may be later records than the record originally selected at as being the latest record at stage 302, or may even be intermediate records which have been received out of order. To account for messages relevant to the loading operation being received after processing has commenced, system 116 may be configured to periodically check for the new payload records relevant to the loading operation and, if a new record is found (that has been generated based on a payload message from a haulage machine 108 rather than synthetically generated by the system 116 itself) restart the process 300 (potentially discarding any synthetic records created to allow for complete recalculation of the loading operation) or select any newly received record for processing from stage 304. Checks for new payload records may, for example, be performed just before a new record is selected for processing (e.g. just before stages 314 or 318), prior to terminating the process (e.g. prior to stage 326), or as a processing step outside process 300.

It will also be appreciated that while process 300 has been described as working backwards through the payload records, it could also be adapted to work forwards through the payload records. For example, instead of starting by selecting the last payload record at stage 302 and selecting a preceding record at stage 318, system 116 could be configured to commence by selecting the earliest existing payload record, at the relevant stage selecting a next payload record, and terminating the process on reaching the final payload record.

Further still, although the process 300 (and various sub-processes described below) has been indicated to be implemented at the remote processing system 116, it will be appreciated that the process 300 (or various parts thereof) could be implemented by the haulage machine processing system 114 itself, either alone or in cooperation with the remote processing system 116.

Determination of Estimated Loading Machine Payload Weight

Several stages of the missing delivery event identification process 300 make use of an estimated loading machine payload weight—i.e. an estimated weight of the material collected in the loading machine dipper 104. This may be determined in a variety of ways.

For example, the estimated loading machine payload weight for a given loading machine 102 may be a constant value (stored in memory and accessed by system 116). This constant could be calculated, for example, according to the volume of the dipper 104 for the relevant loading machine type and the material type (and average weight of the material type if known) being collected. Where limited information is available, for example the type of material is not know, a more generic nominal/constant weight could be used with a higher uncertainty.

By way of one specific example, a CAT 994 Wheel Loader has a bucket capacity of 19 cubic meters heaped, and 15 cubic meters struck (providing, for example a dipper volume of 17+/−2 cubic meters). Coal has a loose density of 0.88-0.96 tonnes/cubic meter (providing, for example, a weight of 0.92+/−0.04 tonnes per cubic meter). Combining these provides a rang of (15*0.88) to (19*0.96), or 17+/−3 tonnes.

Alternatively, where sufficient data exists system 116 may be configured to use that data to try and estimate a more accurate loading machine payload weight for a given type of loading machine 102. This can be done, for example, by taking the mode of a loading machine payload weight dataset in respect of the given loading machine type (the generation of which is discussed below). Alternatively, system 116 could be configured to set the estimated loading machine payload weight as the average of such a dataset.

Where the estimated loading machine payload weight is based on the loading machine payload weight dataset, system 116 may be configured to periodically recalculate the estimated loading machine payload weight to account for the fact that as more payload records (or other data) become available the dataset will be updated with additional information.

In one embodiment system 116 is configured to use a predetermined constant value for the estimated loading machine payload weight until sufficient data is collected to be able to generate a sufficiently large loading machine payload weight dataset. Once a sufficiently large dataset exists (and, accordingly, the average value is deemed a reliable estimate) system 116 then uses the mode (or average) of the dataset as the estimated loading machine payload. An appropriate dataset size for a loader operating with 2-3 types of material may be approximately 20 samples. As the population size increases uncertainty will decrease by a factor of 1/sqrt(N), where N is the number of samples. This presumes that the data does not vary with time for a given loading machine, which is likely to be the case.

Generating a Loading Machine Payload Weight Dataset

In order to generate a loading machine payload weight dataset for a given type of loading machine, system 116 is configured to identify relevant payload records and for each relevant payload record calculate a delivery weight.

This may be done, for example, by building a dataset of the delivery weights calculated at stage 304 of process 300 (i.e. by storing the result of the calculation in a relevant database field or file for later access). In this case, however, delivery weights are only recorded in the dataset if the delivery weight does not exceed the acceptable value (as per stage 306).

Relevant payload records for generating a loading machine payload weight dataset for a particular type of loading machine 102 are those payload records in respect of any haulage machine 108 receiving material of a loading machine 102 of the particular type. In this instance it is not necessary to limit the records to those relating to a particular delivery event.

Acceptable Value

Stage 306 of the missing delivery event identification process 300 involves comparing the delivery weight of a selected payload record with an acceptable value. Generally speaking this comparison is intended to identify whether the delivery weight could reasonably be the result of a single delivery event.

In order to make this comparison the acceptable value can be determined in a variety of different ways.

For example, the acceptable value may be set as the estimated loading machine payload weight as discussed above.

Alternatively, recognizing that there will typically be variation in the actual weight of the loading machine payload (i.e. the weight of the material collected in the loading machine dipper 104), the acceptable value may be set as the estimated loading machine payload weight plus a determined variance.

The determined variance could, for example, be a constant—e.g. a set weight (according to the type of the loading machine 102 and the type of material being loaded), or a percentage of the estimated loading machine payload weight (e.g. 5% or 10%).

Alternatively, and where sufficient data exists, the variance may be set such that a delivery weight will only exceed the acceptable value if it exceeds the estimated loading machine payload weight by a statistically significant amount. This is determined with reference to a given level of significance/confidence interval, such as a 0.05 level of significance (or a 95% confidence interval).

Whether or not the delivery weight is significantly different to the estimated loading machine payload weight is determined with reference to the values of the loading machine payload weight dataset, the generation of which is discussed above.

Weight Uncertainty

As mentioned above, in some embodiments system 116 is configured to determine a weight uncertainty value with respect to the weight values of synthetic payload records (at stage 308).

This uncertainty can be calculated in a variety of ways, though in the present embodiment is determined with reference to the spread (or dispersion) of the values in the loading machine payload weight dataset. Standard error can, for example, be used to estimate the spread of the calculated parameters.

If there are only a small number of records in the loading machine payload weight dataset a nominal uncertainty may be used (for example as per the calculations above).

By making use of weight uncertainties the hypotheses that a dipper has been missed and/or that carryback is not zero can be tested. Uncertainties in time, on the other hand, can be used to test the hypothesis that two events are coincident (which may be useful for downstream processing of the data).

Example

Figure 5:
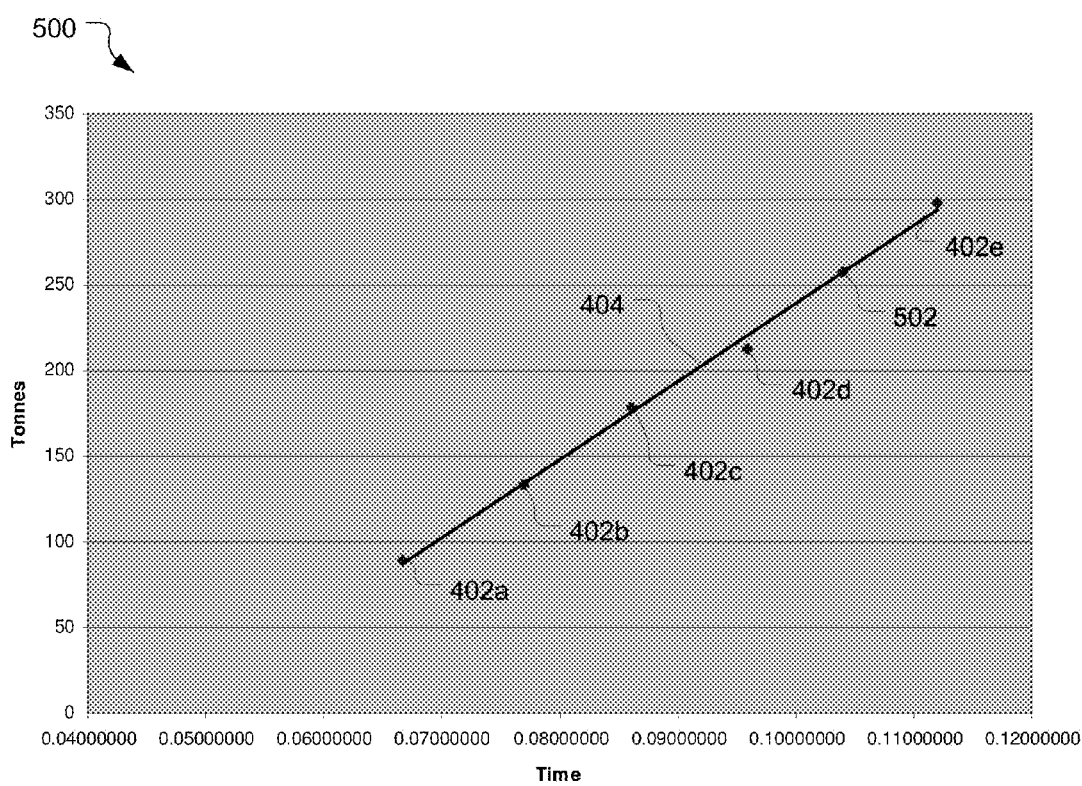
FIGS. 5 and 6 show the graph of FIG. 4 with additional dipper information generated in accordance with an embodiment of the invention.
Figure 6:
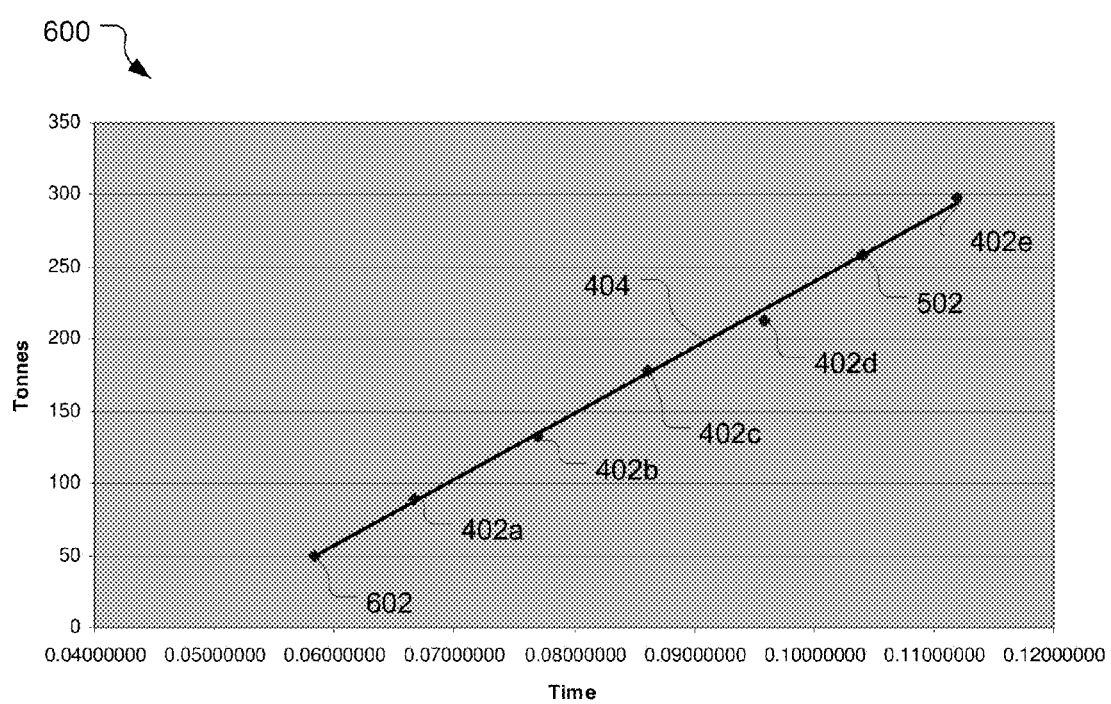

In order to further illustrate the missing delivery event identification process, a specific example will be described with reference to the loading operation data of Table 2 and the graphs of FIGS. 4 to 6. For the purposes of the illustration it will be presumed that the estimated loading machine payload weight is 40 tonnes+/−5 tonnes. In this case the threshold value will be [(45+(1.96*5)=49.8] (1.96 being selected in order to give a significance level of 0.25).

Figure 4:
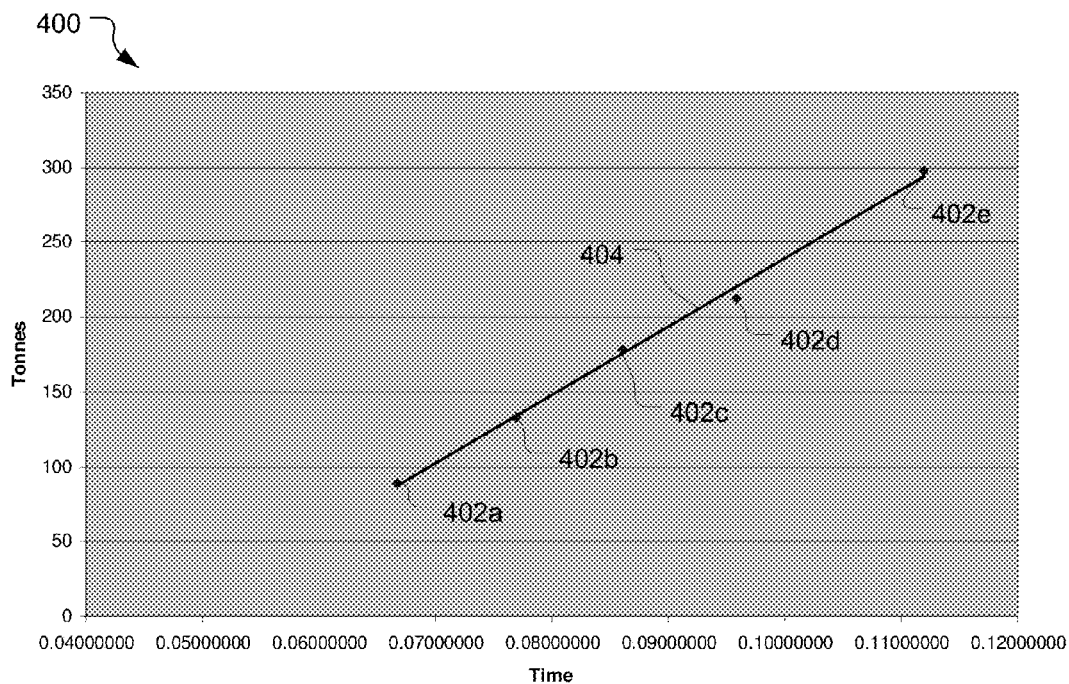
FIG. 4 is a graph providing an example of dipper information as received from a haulage machine.

FIG. 4 is a graph 400 of the loading operation data of Table 2 with datapoints 402a, 402b, 402c, 402d and 402e corresponding to the payload records. The y axis of graph 400 indicates weight in tonnes, and the x axis indicates time in hours from 18:00. Graph 400 also illustrates a trendline 404 illustrating the relationship between the records and calculated by performing a regression analysis of the records. In this particular instance the relationship is: y=(4568.9+/−152.8)*x+(−217.51+/−13.58) (y being the haulage machine payload weight and x being the timing value).

In accordance with the missing delivery event identification process 300, system 116:

Identifies the payload record with a weight of 297.9 tonnes as the latest payload record (stage 302).

Calculates the delivery weight as 85.1 tonnes (297.9−212.8) (stage 304).

Determines the delivery weight to be greater than the threshold value (85.1>49.8) (stage 306). This represents a test of the hypothesis H0: delivery weight=estimated loading machine payload weight, which in this instance is rejected.

Calculates a synthetic record weight value as 257.9 tonnes (297.9−40), and an associated weight uncertainty as +/−5) (stage 308).

Calculates a synthetic record timing value as 18:06:15 (0.10405349) [257.9=(4568.9*0.10405349)−217.51]. As described above, an associated timing uncertainty is also calculated using in this instance the technique proposed by NIST, which provides a timing uncertainty of 0.00098454 hours (stage 310).

Updates the loading operation data with the generated synthetic record (stage 312) to provide loading operation data as shown in Table 3 below. FIG. 5 is a graph 500 of the loading operation data of Table 3. In addition to original datapoints 402, graph 500 has datapoint 502 corresponding to the newly generated synthetic payload record.

TABLE 3

| Message ID | Machine ID | Payload weight | Payload Uncertainty | Time | Time uncertainty |
|---|---|---|---|---|---|
| HMPW | HM0001 | 89.1 | | 18:04:00 (0.06666667) | |
| HMPW | HM0001 | 132.9 | | 18:04:37 (0.07694444) | |
| HMPW | HM0001 | 178.6 | | 18:05:10 (0.08611111) | |
| HMPW | HM0001 | 212.8 | | 18:05:45 (0.09583333) | |
| HMPW | HM0001 | 257.9 | +/−5 | 18:06:15 (0.10405349) | 0.00098454 |
| HMPW | HM0001 | 297.9 | | 18:06:43 (0.11194444) | |

Selects the newly created synthetic record (stage 314).
Calculates the delivery weight as 45.1 tonnes (257.9−212.8) (stage 304);
Determines the delivery weight is not greater than the threshold value (45.1<=49.8) (stage 306).
Determines the selected record is not the earliest payload record in the loading operation data (stage 316).
Selects the preceding record (having a weight of 212.8) as the selected record (stage 318).
Calculates and determines that the delivery weight of the selected record (34.2) is not greater than the threshold value (stages 304 and 306), determines the selected record is not the earliest payload record (stage 316) and selects the preceding record (having a weight of 178.6) as the selected record (stage 318).
Calculates and determines that the delivery weight of the selected record (45.7) is not greater than the threshold value (stages 304 and 306), determines the selected record is not the earliest payload record (stage 316) and selects the preceding record (having a weight of 132.9) as the selected record (stage 318).
Calculates and determines that the delivery weight of the selected record (43.8) is not greater than the threshold value (stages 304 and 306), determines the selected record is not the earliest payload record (stage 316) and selects the preceding record (having a weight of 89.1) as the selected record (stage 318)
Calculates the delivery weight as 89.1 tonnes (89.1−0) (stage 304).
Determines the delivery weight to be greater than the threshold value (89.1>49.8) (stage 306).
Calculates a synthetic record weight value as 49.1 tonnes (89.1−40), and an associated weight uncertainty as +/−5) (stage 308).
Calculates a synthetic record timing value as 18:03:30 (0.05835321) [49.1=(4568.9*0.05835321)−217.51], and an associated timing uncertainty of 0.000956552 hours (stage 310).
Updates the loading operation data with the generated synthetic record (stage 312) to provide loading operation data as shown in Table 4 below. FIG. 6 is a graph 600 of the loading operation data of Table 4. In addition to original datapoints 402 and 502, graph 600 has datapoint 602 corresponding to the newly generated synthetic payload record.

Selects the newly created synthetic record (stage 314).
Calculates the delivery weight as 49.1 tonnes (49.1−0) (stage 304).
Determines the delivery weight not to be greater than the threshold value (49.1<=49.8) (stage 306).
Determines the selected record is the earliest payload record in the loading operation data (stage 316).
Flags the selected record as the first delivery event for the loading operation (stage 320).
Determines the record weight minus the estimated loading machine payload weight (9.1 tonnes) is significantly greater than zero (stage 322).
Generates a carryback value of 9.1 tonnes (49.1−40) (Stage 324);
Finishes (stage 326).

It will be understood that the invention disclosed and defined in this specification extends to all alternative combinations of two or more of the individual features mentioned or evident from the text or drawings. All of these different combinations constitute various alternative aspects of the invention.

The invention claimed is:
1. A method for processing loading operation data to estimate one or more delivery events, the loading operation data comprising a plurality of payload records, each payload record representing a delivery event, wherein the method comprises:
 delivering material from a loading machine into a haulage machine thereby generating payload messages; and
 for a selected payload record, operating a processing unit to:
 determine whether a delivery weight in respect of the selected payload record is likely to reflect a single delivery event, the determination being based at least in part on an estimated loading machine payload weight;
 if the delivery weight is unlikely to reflect a single delivery event, generate a synthetic payload record representing an estimated delivery event, the synthetic payload record comprising:
 a weight value representing an estimated haulage machine payload weight at the estimated delivery event, and

TABLE 4

| Message ID | Machine ID | Payload weight | Payload Uncertainty | Time | Time uncertainty |
|---|---|---|---|---|---|
| HMPW | HM0001 | 49.1 | +/−5 | 18:03:30 (0.05835321) | 0.000956552 |
| HMPW | HM0001 | 89.1 | | 18:04:00 (0.06666667) | |
| HMPW | HM0001 | 132.9 | | 18:04:37 (0.07694444) | |
| HMPW | HM0001 | 178.6 | | 18:05:10 (0.08611111) | |
| HMPW | HM0001 | 212.8 | | 18:05:45 (0.09583333) | |
| HMPW | HM0001 | 257.9 | +/−5 | 18:06:15 (0.10405349) | 0.00098454 |
| HMPW | HM0001 | 297.9 | | 18:06:43 (0.11194444) | | a timing value representing an estimated time at which the weight value for the synthetic payload record would have occurred, and update the loading operation data by incorporating the synthetic payload record into the loading operation data;

wherein the updated loading operation data provides a more accurate record of loading operations for which the payload messages may not accurately report.

2. A method according to claim 1, wherein determining whether the delivery weight in respect of the selected payload record is likely to reflect a single delivery event comprises:

comparing the delivery weight with an acceptable value; and if the delivery weight is greater than the acceptable value determining that the delivery weight is not likely to reflect a single delivery event.

3. A method according to claim 2, wherein the acceptable value is calculated so that the delivery weight in respect of the selected payload record will not be determined to be likely to reflect a single delivery event if the delivery weight exceeds the estimated loading machine payload weight by a statistically significant amount.

4. A method according to claim 1, wherein the estimated loading machine payload weight is calculated with reference to a loading machine payload weight dataset.

5. A method according to claim 4, wherein the estimated loading machine payload weight is one of the mode or the mean of values in the loading machine payload weight dataset.

6. A method according to claim 4, wherein the loading machine payload weight dataset is populated with delivery weights in respect of payload records.

7. A method according to claim 6, wherein the delivery weight of a given payload record is calculated by subtracting a weight value of an immediately preceding payload record in the loading operation data from the weight value of the given payload record.

8. A method according to claim 1, wherein the timing value is determined by reference to a relationship between the plurality of payload records.

9. A method according to claim 8, wherein the relationship is determined by performing a regression analysis of the plurality of payload records.

10. A method according to claim 1, further comprising operating the processing unit to re-implement the method of claim 1 using the loading operation data as updated with the synthetic payload record.

11. A method according to claim 1, wherein if the delivery weight is determined to be likely to reflect a single delivery event, and the selected payload record is an earliest payload record in the loading operation data, the method further comprises:

determining a difference between the weight value of the selected payload record and the estimated loading machine payload weight to be carry-back.

12. A method according to claim 1, wherein generating the synthetic payload record further comprises:

determining a weight uncertainty representing an uncertainty with respect to the weight value of the synthetic payload record; and determining a timing uncertainty representing an uncertainty with respect to the estimated timing value of the synthetic payload record.

13. A method according to claim 12, wherein the weight uncertainty for the synthetic payload record is determined with reference to a measure of dispersion of values in a loading machine payload weight dataset.

14. A method according to claim 12, wherein the timing uncertainty for the synthetic payload record is determined with reference to the weight uncertainty and a relationship between the plurality of payload records.

15. A system comprising:

A loading machine delivering material from the loading machine into a haulage machine thereby generating payload messages; and a non-transitory computer-readable medium comprising instructions which, when implemented by a computer processing system, cause the computer processing system to process loading operation data comprising a plurality of payload records, each payload record representing a delivery event, to estimate one or more delivery events by:

determining whether a delivery weight in respect of a selected payload record is likely to reflect a single delivery event, the determination being based at least in part on an estimated loading machine payload weight;

if the delivery weight is unlikely to reflect a single delivery event, generating a synthetic payload record representing an estimated delivery event, the synthetic payload record comprising:

a weight value representing an estimated haulage machine payload weight at the estimated delivery event, and a timing value representing an estimated time at which the weight value for the synthetic payload record would have occurred, and updating the loading operation data by incorporating the synthetic payload record into the loading operation data;

wherein the updated loading operation data provides a more accurate record of loading operations for which the payload messages may not accurately report.

16. A processing system comprising:

means for delivering material from a loading machine into a haulage machine thereby generating payload messages;

means for accessing loading operation data comprising a plurality of payload records, each payload record representing a delivery event;

means for selecting a payload record from the loading operation data;

means for determining whether a delivery weight in respect of the selected payload record is likely to reflect a single delivery event, the determination being based at least in part on an estimated loading machine payload weight;

means for, if the delivery weight is unlikely to reflect a single delivery event, generating a synthetic payload record representing an estimated delivery event, the synthetic payload record comprising:

a weight value representing an estimated haulage machine payload weight at the estimated delivery event, and a timing value representing an estimated time at which the weight value for the synthetic payload record would have occurred, and means for updating the loading operation data by incorporating the synthetic payload record into the loading operation data, wherein the updated loading operation data provides a more accurate record of loading operations for which the payload messages may not accurately report.

17. A method for processing loading operation data to estimate one or more delivery events, the loading operation data comprising a plurality of payload records, each payload record representing a delivery event and comprising:
- a weight value representing a weight of a haulage machine payload at a particular time; and a timing value representing the particular time, wherein the method comprises:

delivering material from a loading machine into a haulage machine thereby generating payload messages; and operating a computer processing unit to:

compare a weight value of a selected payload record to an acceptable value, the acceptable value being based at least in part on an estimated loading machine payload weight;

if the weight value of the earliest existing payload record is greater than the acceptable value, generating a synthetic payload record representing an estimated earlier delivery event, the synthetic payload record comprising:

a weight value equal to a difference between the weight value of the selected payload record and the estimated loading machine payload weight, and a timing value representing an estimated time at which the weight value for the synthetic payload record would have occurred, the timing value being based on a relationship between the plurality of payload records, and updating the payload delivery data by incorporating the synthetic payload record into the payload data;

wherein the updated loading operation data provides a more accurate record of loading operations for which the payload messages may not accurately report.

* * * * *

UNITED STATES PATENT AND TRADEMARK OFFICE
CERTIFICATE OF CORRECTION

PATENT NO. : 9,508,053 B2  
APPLICATION NO. : 14/057462  
DATED : November 29, 2016  
INVENTOR(S) : Darryl Victor Collins Page 1 of 1

It is certified that error appears in the above-identified patent and that said Letters Patent is hereby corrected as shown below:

On the Title Page

Column 2, (Primary Examiner), Line 1, delete "Robert Rennema" and insert -- Robert Fennema --.

Signed and Sealed this
Fourth Day of April, 2017

Michelle K. Lee
*Director of the United States Patent and Trademark Office*